United States Patent
Nishida

(10) Patent No.: US 12,049,565 B2
(45) Date of Patent: Jul. 30, 2024

(54) POLYARYLENE SULFIDE RESIN COMPOSITION, MOLDED BODY OF SAME, METHOD FOR PRODUCING POLYARYLENE SULFIDE RESIN COMPOSITION, AND METHOD FOR PRODUCING MOLDED BODY

(71) Applicant: DIC Corporation, Tokyo (JP)

(72) Inventor: Takuya Nishida, Ichihara (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 17/432,530

(22) PCT Filed: Feb. 20, 2020

(86) PCT No.: PCT/JP2020/006757
§ 371 (c)(1),
(2) Date: Aug. 20, 2021

(87) PCT Pub. No.: WO2020/171164
PCT Pub. Date: Aug. 27, 2020

(65) Prior Publication Data
US 2022/0106486 A1    Apr. 7, 2022

(30) Foreign Application Priority Data

Feb. 22, 2019    (JP) ................. 2019-030554

(51) Int. Cl.
*C08K 3/40* (2006.01)
*C08L 81/02* (2006.01)
*C08L 81/04* (2006.01)

(52) U.S. Cl.
CPC .................. *C08L 81/04* (2013.01)

(58) Field of Classification Search
CPC .......... C08L 81/04; C08L 81/02; C08L 23/00; C08L 33/06; C08L 33/068; C08G 75/02; C08J 2381/04; C08J 2423/08; C08J 3/203; C08J 5/043; C08J 5/10; C08K 3/40; C08K 2201/003; C08K 3/34; C08K 7/14

USPC .......................................................... 524/494
See application file for complete search history.

(56) References Cited

U.S. PATENT DOCUMENTS

| 2015/0080498 A1* | 3/2015 | Uchigata | .................. C08K 7/14 523/433 |
| 2022/0017722 A1* | 1/2022 | Nishida | ..................... C08K 7/14 |

FOREIGN PATENT DOCUMENTS

| JP | H0657137 A | 3/1994 |
| JP | H09104816 A | 4/1997 |
| JP | H09-124940 A | 5/1997 |
| JP | 2000-327779 A | 11/2000 |
| JP | 2001-31867 A | 2/2001 |
| JP | 2002-3716 A | 1/2002 |
| JP | 2002-129014 A | 5/2002 |
| JP | 2003-253119 A | 9/2003 |
| JP | 2010-13515 A | 1/2010 |
| JP | 2011-173946 A | 9/2011 |
| JP | 2018-53003 A | 4/2018 |
| JP | 2018-53004 A | 4/2018 |
| WO | 2013/141363 A1 | 9/2013 |
| WO | 2020/080289 A1 | 4/2020 |

* cited by examiner

*Primary Examiner* — Hannah J Pak
(74) *Attorney, Agent, or Firm* — Locke Lord LLP; James E. Armstrong, IV; Nicholas J. DiCeglie, Jr.

(57) ABSTRACT

Provided are a polyarylene sulfide resin composition which is a raw material for a molded body having excellent thermal shock properties and for a molded body having excellent mechanical strength at a weld portion and excellent flexural toughness in the TD direction, a molded body of the polyarylene sulfide resin composition, a method for producing the polyarylene sulfide resin composition, and a method for producing the molded body. More specifically, provided are a polyarylene sulfide resin composition containing a polyarylene sulfide resin (A), an olefin polymer (B), zeolite (C), glass fibers (D1), and glass flakes (D2), wherein the glass flakes (D2) have a weight average particle diameter in the range of 100 μm or less, a molded body, and a method for producing the same.

9 Claims, 1 Drawing Sheet

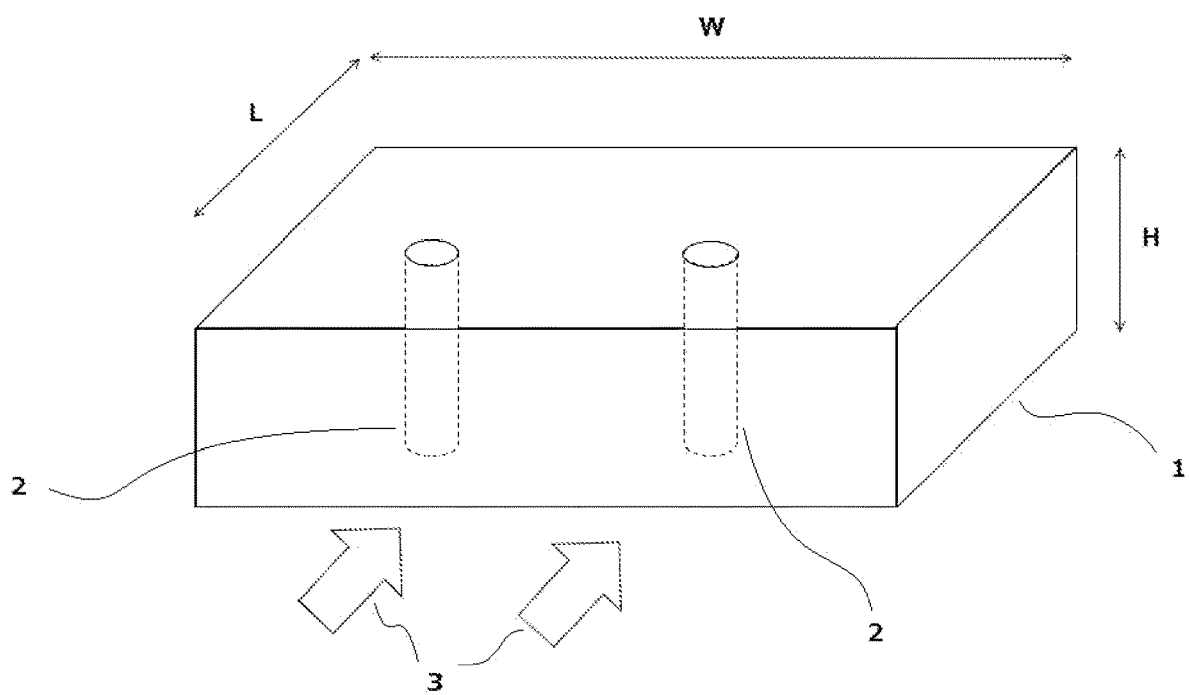

POLYARYLENE SULFIDE RESIN COMPOSITION, MOLDED BODY OF SAME, METHOD FOR PRODUCING POLYARYLENE SULFIDE RESIN COMPOSITION, AND METHOD FOR PRODUCING MOLDED BODY

TECHNICAL FIELD

The present invention relates to a resin composition containing a polyarylene sulfide resin (hereinafter, referred to as "polyarylene sulfide resin composition") and a molded body obtained by molding the polyarylene sulfide resin composition, a method for producing the polyarylene sulfide resin composition, and a method for producing the molded body.

BACKGROUND ART

Polyarylene sulfide (hereinafter, frequently referred to as "PAS") resins, such as a polyphenylene sulfide (hereinafter, frequently referred to as "PPS") resin, are known as an engineering plastic exhibiting such excellent heat resistance that it can have a melting point as high as 270° C. or more. However, the PAS resins have been known to be generally poor in toughness, as compared to other engineering plastics, and, taking into consideration the use of ultimate products of the resins and the form thereof, the PAS resins are needed to be improved in molding flowability, thermal shock properties, and the like.

For example, in PTL 1 shown below, there is a description about a technique such that a resin composition containing a polyphenylene sulfide resin, glass flakes and an inorganic filler other than the glass flakes as an inorganic filler, and an olefin polymer, wherein the amount of the incorporated glass flakes and inorganic filler other than the glass flakes is in a predetermined range, has improved low gas generation properties during injection molding, thermal shock properties of the molded body, and the like.

Further, in PTL 2 shown below, there is a description about a technique such that a resin composition containing polyarylene sulfide, a maleic anhydride-containing olefin copolymer, an alkoxysilane coupling agent, glass flakes, and glass fibers has improved toughness, bonding strength, dimensional accuracy, and moldability of the molded body.

CITATION LIST

Patent Literature

PTL 1: JP-A-2002-129014
PTL 2: JP-A-2010-13515

SUMMARY OF INVENTION

Technical Problem

In recent years, parts produced in various technical fields have a complicated structure, and molded bodies of the resin composition are required to have further improved thermal shock properties, and conventional techniques including the techniques described in the above Patent Literature cannot satisfy the demands of the market. Especially when molding a molded body by injection molding or the like, a problem of material fracture caused at a weld portion which is the most brittle in the structure of the molded body is likely to occur, and, for solving the problem, it is necessary to improve the mechanical strength of the weld portion of the molded body. In addition, it is necessary to prevent the molded body from having poor flexural toughness in the TD direction due to anisotropy during the molding. In the present invention, the term "TD direction" means the direction (Transverse Direction) perpendicular to the "MD direction (Machine Direction)" which means the flow direction of the resin being molded.

In view of the above, the present invention has been developed, and a task of the invention is to provide a polyarylene sulfide resin composition which is a raw material for a molded body having excellent mechanical strength at a weld portion and excellent flexural toughness in the TD direction, a molded body of the polyarylene sulfide resin composition, a method for producing the polyarylene sulfide resin composition, and a method for producing the molded body. Further, another task is to provide a polyarylene sulfide resin composition which is a raw material for a molded body having excellent thermal shock properties, a molded body of the polyarylene sulfide resin composition, a method for producing the polyarylene sulfide resin composition, and a method for producing the molded body.

Solution to Problem

The present inventors have made studies with a view toward solving the above-mentioned problems, and have conducted extensive and intensive studies on the crystallization behavior of the PAS resin which is melted upon molding. As a result, it has been found that when a predetermined amount of zeolite is incorporated into the polyarylene sulfide resin composition as a nucleating agent for the PAS resin, the molded body of the resin composition can be remarkably improved in mechanical strength at a weld portion, and that when the glass flakes having a reduced particle diameter are incorporated, the molded body can be improved in flexural toughness in the TD direction, and further can be improved in thermal shock properties, and the present invention has been completed.

Specifically, the present invention is directed to a polyarylene sulfide resin composition containing a polyarylene sulfide resin (A), an olefin polymer (B), zeolite (C), glass fibers (D1), and glass flakes (D2), wherein the glass flakes (D2) have a weight average particle diameter of 30 to 100 μm.

Further, the present invention is directed to a molded body which is obtained by molding the above-mentioned polyarylene sulfide resin composition.

Further, the present invention is directed to a method for producing a polyarylene sulfide resin composition, the method having the step of melt-kneading a polyarylene sulfide resin (A), an olefin polymer (B), zeolite (C), glass fibers (D1), and glass flakes (D2) at the melting point of the polyarylene sulfide resin (A) or higher, wherein the glass flakes (D2) have a weight average particle diameter of 30 to 100 μm.

Furthermore, the present invention is directed to a method for producing a molded body, the method having the step of producing a polyarylene sulfide resin composition by the above-mentioned method, and the step of melt-molding the obtained polyarylene sulfide resin composition.

Advantageous Effects of Invention

In the present invention, there can be provided a polyarylene sulfide resin composition which is a raw material for a molded body having excellent mechanical strength at a weld portion and excellent flexural toughness in the TD direction, a molded body of the polyarylene sulfide resin composition, a method for producing the polyarylene sulfide resin composition, and a method for producing the molded body. Further, in the invention, there can be provided a polyarylene sulfide resin composition which is a raw material for a molded body having excellent thermal shock properties, a molded body of the polyarylene sulfide resin composition, a method for producing the polyarylene sulfide resin composition, and a method for producing the molded body.

BRIEF DESCRIPTION OF DRAWING

FIG. 1 A diagrammatic view of the SUS steel material having a rectangular parallelepiped shape used in the method for evaluating thermal shock properties in the Examples.

DESCRIPTION OF EMBODIMENTS

The polyarylene sulfide resin composition of the present invention contains a PAS resin (A), an olefin polymer (B), zeolite (C), glass fibers (D1), and glass flakes (D2). Hereinbelow, the constituents of the resin composition will be individually described.

The polyarylene sulfide resin composition of the invention contains a PAS resin (A) as an essential component. The PAS resin (A) used in the invention has a resin structure in which a structure having an aromatic ring and a sulfur atom bonded to each other constitutes repeating units, specifically, the PAS resin (A) is a resin having a structural site represented by the following general formula (1):

[Chem. 1]

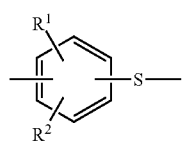

Formula (1)

wherein each of $R^1$ and $R^2$ independently represents a hydrogen atom, an alkyl group having 1 to 4 carbon atoms, a nitro group, an amino group, a phenyl group, a methoxy group, or an ethoxy group
and, if necessary, further a trifunctional structural site represented by the following general formula (2):

[Chem. 2]

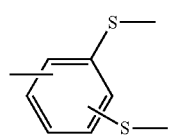

Formula (2)

as repeating units. The amount of the trifunctional structural site represented by the formula (2), based on the total mole of the trifunctional structural site and the other structural sites, is preferably in the range of 0.001 to 3 mol %, especially preferably in the range of 0.01 to 1 mol %.

With respect to the structural site represented by the general formula (1) above, particularly, $R^1$ and $R^2$ in the general formula (1) are preferably a hydrogen atom in view of the mechanical strength of the PAS resin (A), and, as examples of the structural site in such a case, there can be mentioned a structural site represented by the following formula (3) in which the sulfur atom is bonded to the aromatic ring at the para-position, and a structural site represented by the following formula (4) in which the sulfur atom is bonded to the aromatic ring at the meta-position.

[Chem. 3]

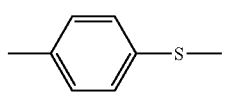

Formula (3)

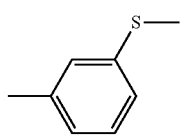

Formula (4)

Of these, particularly, with respect to the bonding of the sulfur atom to the aromatic ring in the repeating units, the structure represented by the general formula (3) above in which the sulfur atom is bonded to the aromatic ring at the para-position is preferred in view of the heat resistance and crystalline properties of the PAS resin (A).

Further, the PAS resin (A) may contain not only the structural sites represented by the general formulae (1) and (2) above but also structural sites represented by the following structural formulae (5) to (8):

[Chem. 4]

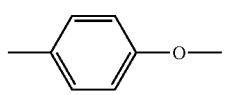

Formula (5)

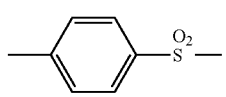

Formula (6)

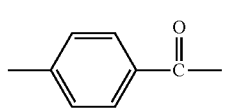

Formula (7)

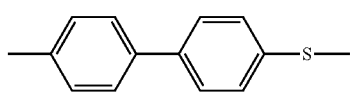

Formula (8)

in an amount of 30 mol % or less of the total of the structural site represented by the general formula (1) and the structural site represented by the general formula (2). Particularly, in the invention, the amount of the structural sites represented by the general formulae (5) to (8) above is preferably 10 mol % or less in view of the heat resistance and mechanical strength of the PAS resin (A). When the PAS resin (A) contains the structural sites represented by the general formulae (5) to (8) above, the bonding of these sites may be any of a random copolymer and a block copolymer.

Further, the PAS resin (A) may have in the molecular structure thereof a naphthyl sulfide bond or the like, but the amount of the naphthyl sulfide bond or the like, based on the total mole of the naphthyl sulfide bond or the like and the other structural sites, is preferably 3 mol % or less, especially preferably 1 mol % or less.

With respect to the method for producing the PAS resin (A), there is no particular limitation, but there can be mentioned, for example, (method 1) in which a dihalogeno aromatic compound and, if necessary, a polyhalogeno aromatic compound or another copolymerizable component are subjected to polymerization in the presence of sulfur and sodium carbonate, (method 2) in which a dihalogeno aromatic compound and, if necessary, a polyhalogeno aromatic compound or another copolymerizable component are subjected to polymerization in a polar solvent in the presence of a sulfidating agent or the like, (method 3) in which p-chlorothiophenol and, if necessary, another copolymerizable component are subjected to self-condensation, and (method 4) in which a diiodo aromatic compound and sulfur in the form of a simple substance are subjected to melt polymerization in the presence of a polymerization inhibitor optionally having a functional group, such as a carboxyl group or an amino group, under a reduced pressure. Of these methods, the (method 2) is generally used and preferred. In the reaction, for controlling the degree of polymerization, an alkali metal salt of a carboxylic acid or sulfonic acid, or an alkali hydroxide may be added. Particularly preferred is the PAS resin obtained by the (method 2), especially a method in which a water-containing sulfidating agent is introduced into a heated mixture containing an organic polar solvent and a dihalogeno aromatic compound at such a rate that water can be removed from the reaction mixture, and the dihalogeno aromatic compound and the sulfidating agent and, if necessary, a polyhalogeno aromatic compound are subjected to reaction in the organic polar solvent while controlling the water content in the reaction system to be in the range of 0.02 to 0.5 mol, relative to 1 mol of the organic polar solvent, producing a PAS resin (see JP-A-07-228699), or a method in which a dihalogeno aromatic compound and, if necessary, a polyhalogeno aromatic compound or another copolymerizable component, and an alkali metal hydrogensulfide and an organic acid alkali metal salt are subjected to reaction in the presence of an alkali metal sulfide in a solid form and an aprotic polar organic solvent while controlling the organic acid alkali metal salt to be in the range of 0.01 to 0.9 mol, relative to 1 mol of the sulfur source, and the water content in the reaction system to be in the range of 0.02 mol or less, relative to 1 mol of the aprotic polar organic solvent (see WO2010/058713 pamphlet). Specific examples of dihalogeno aromatic compounds include p-dihalobenzene, m-dihalobenzene, o-dihalobenzene, 2,5-dihalotoluene, 1,4-dihalonaphthalene, 1-methoxy-2,5-dihalobenzene, 4,4'-dihalobiphenyl, 3,5-dihalobenzoic acid, 2,4-dihalobenzoic acid, 2,5-dihalonitrobenzene, 2,4-dihalonitrobenzene, 2,4-dihaloanisole, p,p'-dihalodiphenyl ether, 4,4'-dihalobenzophenone, 4,4'-dihalodiphenyl sulfone, 4,4'-dihalodiphenyl sulfoxide, 4,4'-dihalodiphenyl sulfide, and the above compounds each having in the aromatic ring thereof an alkyl group having 1 to 18 carbon atoms, and examples of polyhalogeno aromatic compounds include 1,2,3-trihalobenzene, 1,2,4-trihalobenzene, 1,3,5-trihalobenzene, 1,2,3,5-tetrahalobenzene, 1,2,4,5-tetrahalobenzene, and 1,4,6-trihalonaphthalene. Further, the halogen atom contained in the above-mentioned compounds is preferably a chlorine atom or a bromine atom.

With respect to the after-treatment method for the reaction mixture containing the PAS resin obtained in the polymerization step, there is no particular limitation, but there can be mentioned, for example, (after-treatment 1) method in which, after completion of the polymerization reaction, the solvent is first distilled off from the reaction mixture as such, or the reaction mixture after an acid or a base is added thereto, under a reduced pressure or under atmospheric pressure, and then the solid material obtained after distilling off the solvent is washed with a solvent, such as water, the reaction solvent (or an organic solvent having an equivalent solubility for a low-molecular weight polymer), acetone, methyl ethyl ketone, or an alcohol, once or two or more times, and further subjected to neutralization, washing with water, filtration, and drying, (after-treatment 2) method in which, after completion of the polymerization reaction, a solvent (a solvent which is soluble in the polymerization solvent used, and which is a poor solvent with respect to at least the PAS), such as water, acetone, methyl ethyl ketone, an alcohol, an ether, a halogenated hydrocarbon, an aromatic hydrocarbon, or an aliphatic hydrocarbon, is added as a precipitant to the reaction mixture to cause the products in the solid state including the PAS and an inorganic salt to precipitate, and the resultant precipitates are subjected to filtration, washing, and drying, (after-treatment 3) method in which, after completion of the polymerization reaction, the reaction solvent (or an organic solvent having an equivalent solubility for a low-molecular weight polymer) is added to the reaction mixture and the resultant mixture is stirred, and then subjected to filtration to remove the low-molecular weight polymer, and then washed with a solvent, such as water, acetone, methyl ethyl ketone, or an alcohol, once or two or more times, and then subjected to neutralization, washing with water, filtration, and drying, (after-treatment 4) method in which, after completion of the polymerization reaction, water is added to the reaction mixture and the reaction mixture is washed with water and subjected to filtration and, if necessary, during the washing with water, an acid is added to the reaction mixture for an acid treatment, followed by drying, and (after-treatment 5) method in which, after completion of the polymerization reaction, the reaction mixture is subjected to filtration and, if necessary, washed with the reaction solvent once or two or more times, and further subjected to washing with water, filtration, and drying.

In the after-treatment methods as mentioned in the (after-treatment 1) to (after-treatment 5) above, the PAS resin (A) may be dried in a vacuum or may be dried in air or in an atmosphere of an inert gas, such as nitrogen gas.

The polyarylene sulfide resin composition of the invention contains an olefin polymer (B) as an essential component. Examples of raw materials for the olefin polymer (B) include a polymer obtained by polymerization of one of or two or more of α-olefins, such as ethylene, propylene, 1-butene, 1-pentene, 4-methyl-1-pentene, and isobutylene, and a copolymer of the above-mentioned α-olefin and an α,β-unsaturated acid or an alkyl ester thereof, such as (meth)acrylic acid, methyl (meth)acrylate, ethyl (meth)acrylate, or butyl (meth)acrylate. In the invention, the term "(meth)acryl" means acryl and/or methacryl.

With respect to the olefin polymer (B), from the viewpoint of improving compatibility of the olefin polymer with the other components of the polyarylene sulfide resin composition, an olefin polymer having a functional group in the polymer thereof is preferably used as a raw material. By virtue of this, it is possible to improve the thermal shock properties of the molded body and the like. Examples of the functional groups include an epoxy group, a carboxyl group, an isocyanate group, an oxazoline group, and a group represented by the formula: R(CO)O(CO)— or R(CO)O—

(wherein R represents an alkyl group having 1 to 8 carbon atoms). The olefin polymer having such a functional group can be obtained by, for example, copolymerization of an α-olefin and a polymerizable vinyl compound having the functional group. Examples of polymerizable vinyl compounds having the functional group include the above-mentioned α,β-unsaturated acids and alkyl esters thereof, maleic acid, fumaric acid, itaconic acid, and other α,β-unsaturated dicarboxylic acids having 4 to 10 carbon atoms and derivatives thereof (such as a mono- or diester, and an acid anhydride thereof), and glycidyl (meth)acrylate. Among the above olefin polymers, as the olefin polymer (B), an olefin polymer having at least one functional group selected from the group consisting of an epoxy group, a carboxyl group, and a group represented by the formula: R(CO)O(CO)— or R(CO)O— (wherein R represents an alkyl group having 1 to 8 carbon atoms) is preferred from the viewpoint of improving the toughness and impact resistance, and particularly, the olefin resin comprising a copolymer of an alkene, an alkyl acrylate, and glycidyl acrylate is preferred.

With respect to the amount of the olefin polymer (B) contained in the polyarylene sulfide resin composition of the invention, relative to 100 parts by mass of the whole amount of the PAS resin (A), the lower limit of the range of the amount of the olefin polymer (B) contained is preferably 5 parts by mass, more preferably 7 parts by mass. On the other hand, the upper limit of the range of the amount of the olefin polymer (B) contained is preferably 15 parts by mass, more preferably 13 parts by mass. When the range of the amount of the olefin polymer (B) contained is designed to be in the above range, both the molding flowability and the thermal shock properties of the molded body can be improved with good balance.

The polyarylene sulfide resin composition of the invention contains zeolite (C) as an essential component. As a raw material for the zeolite (C) used in the invention, a crystalline aluminosilicate which has been known to those skilled in the art can be used, and, for example, there can be mentioned a known material represented by the following general formula.

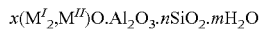

$$x(M^I_2, M^{II})O \cdot Al_2O_3 \cdot nSiO_2 \cdot mH_2O$$

In the above formula, $M^I$ represents a monovalent metal, for example, an alkali metal, such as Li, Na, or K, or ammonium, an alkylammonium, pyridinium, anilinium, a hydrogen ion, or the like, and $M^{II}$ represents a bivalent metal, for example, an alkaline earth metal, such as Ca, Mg, Ba, or Sr. From the viewpoint of efficiently controlling the melt crystallization temperature, it is preferred that $M^{II}$ is Ca and substantially no $M^I$ is present.

With respect to the zeolite (C) used in the invention, any of natural zeolite and synthetic zeolite can be used. Examples of natural zeolite include analcite, wairakite, natrolite, mesolite, thomsonite, gonnardite, scolecite, edingtonite, gismondine, laumontite, mordenite, yugawaralite, erionite, ashcroftine, heulandite, clinoptilolite, stilbite, epistilbite, d'achiardite, phillipsite, harmotome, gmelinite, chabazite, and faujasite. Examples of synthetic zeolite include A-type, X-type, Y-type, L-type, mordenite, and chabazite, and preferred examples include A-type zeolite, and further preferred examples include A-type zeolite which contains calcium as a metal atom, and especially preferred examples include A-type zeolite which contains calcium as a metal atom, in which substantially no alkali metal is present. Of the above zeolite, synthetic zeolite is preferably used. With respect to the synthetic zeolite, commercially available synthetic zeolite can be used, and examples include A-type Zeolite A-4 powder, A-type Zeolite A-5 powder (each of which is a trademark; manufactured by Tosoh Corp.), CS-100K, CS-100S (each of which is a trademark; manufactured by Katsuta Kako Co., Ltd.), AMT-25 (trademark; manufactured by Mizusawa Industrial Chemicals, Ltd.), and Mizukalizer ES (trademark; manufactured by Mizusawa Industrial Chemicals, Ltd.).

From the viewpoint of increasing the melt crystallization temperature of the resin composition, the zeolite (C) is preferably in the form of powder particles, and the upper limit of the range of the average particle diameter is preferably 3 μm, especially preferably 2 μm. The average particle diameter is a value (D50) determined by a Coulter counter method. The lower limit of the range of the average particle diameter of the zeolite (C) is preferably 0.1 μm. When the melt crystallization temperature of the resin composition is appropriately increased, solidification of the resin composition due to crystallization of the resin in the mold during injection molding quickly proceeds, making it possible to shorten the molding cycle.

In the polyarylene sulfide resin composition of the invention, the zeolite (C) acts as a nucleating agent for the melted PAS resin (A) which is undergoing crystallization, and thus largely contributes to an improvement of the molded body of the resin composition in mechanical strength at a weld portion. For optimizing the crystallization rate of the PAS resin (A) to improve the molded body in mechanical strength at a weld portion, with respect to the amount of the zeolite (C) contained in the polyarylene sulfide resin composition of the invention, relative to 100 parts by mass of the whole amount of the PAS resin (A), the upper limit of the range of the amount of the zeolite (C) contained is preferably 20 parts by mass, more preferably 15 parts by mass, further preferably 10 parts by mass, most preferably 7 parts by mass. Further, from the viewpoint of causing the zeolite (C) to effectively act as a nucleating agent for the PAS resin (A), the lower limit of the range of the amount of the zeolite (C) contained is preferably 1 part by mass.

The polyarylene sulfide resin composition of the invention contains glass fibers (D1) as an essential component. As a raw material for the glass fibers (D1) used in the invention, one which has been known to those skilled in the art can be used, and the fiber diameter, fiber length, and aspect ratio of the glass fibers and the like can be appropriately selected according to the use of the molded body or the like. For improving the dispersibility in the PAS resin (A), for example, the glass fibers (D1) may be subjected to surface treatment with a known coupling agent or binder or the like. With respect to the amount of the glass fibers (D1) contained in the polyarylene sulfide resin composition of the invention, relative to 100 parts by mass of the whole amount of the PAS resin (A), the lower limit of the range of the amount of the glass fibers (D1) contained is preferably 32 parts by mass, more preferably 48 parts by mass. On the other hand, the upper limit of the range of the amount of the glass fibers (D1) contained is preferably 120 parts by mass, more preferably 100 parts by mass. When the range of the amount of the glass fibers (D1) contained is designed to be in the above range, both the molding flowability and the mechanical strength of the molded body can be improved with good balance.

The polyarylene sulfide resin composition of the invention contains glass flakes (D2) as an essential component. The glass flakes (D2) preferably have a weight average particle diameter in the range of 100 μm or less, more preferably in the range of 30 to 100 μm. In the invention, the glass flakes preferably having a weight average particle diameter in the range of 100 μm or less, more preferably in the range of 30 to 100 μm are used as a raw material. The glass flakes being on the market generally have a weight average particle diameter of even more than 100 μm. It is preferred that the polyarylene sulfide resin composition of the invention contains the PAS resin (A), olefin polymer (B), zeolite (C), and glass fibers (D1) and the glass flakes preferably having a weight average particle diameter in the range of 100 μm or less, more preferably in the range of 30 to 100 μm, because a molded body obtained from the polyarylene sulfide resin composition as a raw material has excellent mechanical strength at a weld portion and excellent flexural toughness in the TD direction. The method for measuring a weight average particle diameter of the glass flakes (D2) is described later.

The weight average particle diameter of the glass flakes (D2) is not a value of the glass flakes per se as a raw material for the resin composition, but a value of the glass flakes as a raw material for a molded body contained in the polyarylene sulfide resin composition which may have a form of pellet, strand, or the like. With respect to the glass flakes (D2), there can be used glass flakes which, before being incorporated into the polyarylene sulfide resin composition, have been controlled to have a weight average particle diameter preferably in the range of 100 μm or less, more preferably in the range of 30 to 100 μm. Alternatively, there can be used glass flakes having a weight average particle diameter of more than 100 μm before being incorporated into the polyarylene sulfide resin composition, wherein the glass flakes have been controlled so that the glass flakes pulverized during being blended finally have a weight average particle diameter preferably in the range of 100 μm or less, more preferably in the range of 30 to 100 μm, in the polyarylene sulfide resin composition.

With respect to the amount of the glass flakes (D2) contained in the polyarylene sulfide resin composition of the invention, relative to 100 parts by mass of the whole amount of the PAS resin (A), the lower limit of the range of the amount of the glass flakes (D2) contained is preferably 4 parts by mass, more preferably 6 parts by mass. On the other hand, the upper limit of the range of the amount of the glass flakes (D2) contained is preferably 70 parts by mass, more preferably 50 parts by mass. When the range of the amount of the glass flakes (D2) contained is designed to be in the above range, both the molding flowability and the reduction of warpage of the molded body can be improved with good balance.

In the invention, in the polyarylene sulfide resin composition, the mass ratio of the glass fibers (D1) to the glass flakes (D2) ((D1)/(D2)) is preferably in the range of 8 or less, more preferably in the range of 5 or less, further preferably in the range of 2 or less. When the range of the (D1)/(D2) is designed to be in the above range, both the mechanical strength at a weld portion of the molded body and the reduction of warpage of the molded body can be improved with good balance. The lower limit of the range of the (D1)/(D2) is not particularly limited, but, for example, there can be mentioned the lower limit of 1 or more.

Further, in the polyarylene sulfide resin composition of the invention, in addition to the above-mentioned components, a synthetic resin other than the above-mentioned PAS resin (A) and olefin polymer (B) (hereinafter, referred to simply as "synthetic resin"), such as an epoxy resin, a polyester resin, a polyamide resin, a polyimide resin, a polyether imide resin, a polycarbonate resin, a polyphenylene ether resin, a polysulfone resin, a polyether sulfone resin, a polyether ether ketone resin, a polyether ketone resin, a polyarylene resin, a polyethylene resin, a polypropylene resin, a polytetrafluoroethylene resin, a polydifluoroethylene resin, a polystyrene resin, an ABS resin, a phenolic resin, an urethane resin, or a liquid crystalline polymer, can be further incorporated as an optional component appropriately according to the use. In the invention, the synthetic resin is not an essential component, but, when the synthetic resin is incorporated, with respect to the amount of the synthetic resin incorporated, there is no particular limitation as long as the effects of the invention are not sacrificed, and the amount of the synthetic resin varies depending on the purpose and cannot be generally specified, but the amount of the synthetic resin incorporated into the polyarylene sulfide resin composition of the invention is, for example, relative to 100 parts by mass of the PAS resin (A), preferably in the range of 5 parts by mass or less, more preferably 10 parts by mass or less, further preferably 15 parts by mass or less. In other words, the ratio of the PAS resin (A) to the total of the PAS resin (A) and the synthetic resin, in terms of a mass, is preferably in the range of (100/115) or more, more preferably (100/110) or more.

Further, in the polyarylene sulfide resin composition of the invention, an additive known and commonly used, such as a coloring agent, an antistatic agent, an antioxidant, a heat stabilizer, an ultraviolet light stabilizer, an ultraviolet light absorber, a foaming agent, a flame retardant, a flame retardant auxiliary, a rust preventive agent, or a coupling agent, may be additionally incorporated as an optional component if necessary. The above additive is not an essential component, but, when the additive is incorporated, with respect to the amount of the additive incorporated, there is no particular limitation as long as the effects of the invention are not sacrificed, and the amount of the additive incorporated varies depending on the purpose and cannot be generally specified, but, for example, is preferably in the range of 0.01 to 1,000 parts by mass, relative to 100 parts by mass of the PAS resin (A), and may be appropriately selected according to the purpose and use so that the effects of the invention are not sacrificed.

The method for producing a polyarylene sulfide resin composition of the invention has the step of mixing together raw materials for a polyarylene sulfide resin (A), an olefin polymer (B), zeolite (C), glass fibers (D1), and glass flakes (D2) as essential components and, if necessary, a raw material for an additional optional component and melt-kneading the resultant mixture at the melting point of the PAS resin or higher.

In the preferred method for producing a polyarylene sulfide resin composition of the invention, a polyarylene sulfide resin composition can be produced through the step of charging raw materials for the essential components and a raw material for the optional component, which are in various forms, such as a form of powder, pellet, or flake, into a ribbon blender, a Henschel mixer, a V-blender, or the like and dry-blending the mixture, and then charging the mixture into a known melt-kneader, such as a Banbury mixer, a mixing roll, a single-screw or twin-screw extruder, or a kneader, and melt-kneading the mixture at a temperature in such a range that the resin temperature becomes the melting point of the PAS resin or higher, preferably at a temperature in such a range that the resin temperature becomes (the melting point of the PAS resin+10° C.) or higher, more preferably at a temperature in such a range that the resin temperature becomes (the melting point of the PAS resin+ 10° C.) to (the melting point of the PAS resin+100° C.), further preferably at a temperature in such a range that the resin temperature becomes (the melting point of the PAS resin+20) to (the melting point of the PAS resin+50° C.).

With respect to the melt-kneader, from the viewpoint of the dispersibility and productivity, a twin-screw kneading extruder is preferred, and, for example, it is preferred that melt-kneading is performed while appropriately controlling the discharge rate of the resin component to be in the range of 5 to 500 (kg/hr) and the screw revolution speed to be in the range of 50 to 500 (rpm), and it is further preferred that melt-kneading is performed under conditions such that the ratio of the discharge rate to the screw revolution speed (discharge rate/screw revolution speed) is in the range of 0.02 to 5 (kg/hr/rpm). Further, with respect to the above-mentioned components, when a filler or an additive is added, it is preferred that the filler or additive is charged into the twin-screw kneading extruder from the side feeder of the extruder from the viewpoint of the dispersibility. With respect to the position of the side feeder, the ratio of the distance between the extruder resin charge portion and the side feeder to the whole length of the screw of the twin-screw kneading extruder is preferably in the range of 0.1 or more, more preferably in the range of 0.3 or more, and is preferably in the range of 0.9 or less, more preferably in the range of 0.3 or less. Accordingly, the ratio is preferably in the range of 0.1 to 0.9. The ratio is especially preferably in the range of 0.3 to 0.7.

As mentioned above, as a method for optimizing the weight average particle diameter of the glass flakes (D2), there can be mentioned the following method. For example, there can be mentioned a method in which, together with the PAS resin (A), olefin polymer (B), and zeolite (C) except the glass fibers (D1), while charging the glass flakes from the top feeder inlet of the above-mentioned melt-kneader, a kneading treatment is conducted and the melt-kneaded mixture (polyarylene sulfide resin composition) is molded into a pellet form or the like, or, while charging the glass flakes into the extruder from the side feeder, a kneading treatment is conducted and the melt-kneaded mixture (polyarylene sulfide resin composition) is molded into a pellet form or the like.

Further, there can be mentioned a method in which a melt-kneading (melt-mixing) treatment is conducted while controlling shearing for the glass flakes. As a method in which a treatment is conducted under conditions such that the glass flakes are unlikely to be sheared, there can be mentioned a method comprising the step of performing mixing or kneading using, as a screw form, for example, a full-flighted type single screw, or a single screw having a mixing mechanism of a Dulmage type, a Maddock type, a pin type, or the like, preferably a method using only the above step. Further, in this instance, a single screw having a compression ratio of 2 or less is preferably used, and further a single screw having a compression ratio in the range of 2 or less and 1 or more is more preferably used, and further a full-flighted type single screw having a compression ratio of 2 or less is especially preferably used. On the other hand, as a method in which a treatment is conducted under conditions such that the glass flakes are likely to be sheared, there can be mentioned a method comprising the step of performing kneading using, as a screw form, for example, a forward direction (having the feed ability) kneading screw, or a reverse direction (having the return ability) kneading screw, or the like. In this instance, with respect to any kneading disc, the lower limit of the angle is preferably 30 degrees or more, more preferably 45 degrees or more. On the other hand, the upper limit is preferably 90 degrees or less. The particle diameter of the glass flakes may be appropriately controlled by the above-mentioned treatment method so that the weight average particle diameter of the glass flakes in the polyarylene sulfide resin composition is in the above-mentioned range, but, when the glass flakes as a raw material tend to be larger than the above-mentioned weight average particle diameter, the conditions such that the glass flakes are likely to be sheared may be appropriately employed, and, when the glass flakes as a raw material tend to be in the above-mentioned range of the particle diameter, the conditions such that the glass flakes are unlikely to be sheared may be appropriately employed.

Further, with respect to the effective length (L/D), there is no particular limitation as long as it is a value used in molding a general polyarylene sulfide resin, and, for example, the effective length is preferably in the range of 1 or more, more preferably in the range of 5 or more, and is preferably in the range of 100 or less, more preferably in the range of 50 or less. Accordingly, the effective length is preferably in the range of 1 to 100, more preferably in the range of 5 to 50.

The polyarylene sulfide resin composition of the invention obtained by melt-kneading as mentioned above is a melt-kneaded mixture (melted mixture) containing the essential components and an optional component added if necessary and a component derived therefrom, and it is preferred that, after the melt-kneading, the resultant resin composition is processed by a known method into a form of pellet, chip, granule, powder, or the like, and, if necessary, preheated at a temperature of 100 to 150° C., and subjected to molding.

The polyarylene sulfide resin composition of the invention produced by the above-mentioned method forms a morphology such that the olefin polymer (B), glass fibers (D1), and glass flakes (D2) are dispersed in the PAS resin (A) as a matrix. Therefore, excellent molding flowability of the polyarylene sulfide resin composition and excellent thermal shock properties of the molded body of the resin composition are achieved. Further, the zeolite (C) present in the resin composition enables optimization of the crystallization behavior of the PAS resin (A) which is undergoing crystallization, so that the molded body obtained from the resin composition has remarkably improved mechanical strength at a weld portion.

The molded body of the invention is obtained by molding the above-mentioned polyarylene sulfide resin composition. Further, the method for producing a molded body of the invention has, for example, the step of melt-molding the above-mentioned polyarylene sulfide resin composition. The melt-molding may be a known method, and various molding methods, for example, injection molding, compression molding, extrusion, such as composite extrusion, sheet extrusion, or pipe extrusion, pultrusion, blow molding, or transfer molding can be used, but particularly, injection molding is suitable. In the melt-molding, with respect to the molding conditions, there is no particular limitation, and molding can be performed by a general method. For example, the method may have the step of melting the polyarylene sulfide resin composition in a melt-molding machine at a temperature in such a range that the resin temperature becomes the melting point of the polyarylene sulfide resin or higher, preferably at a temperature in such a range that the resin temperature becomes (the melting point of the resin+10° C.) or higher, more preferably at a temperature in such a range that the resin temperature becomes (the melting point of the resin+10° C.) to (the melting point of the resin+100° C.), further preferably at a temperature in such a range that the resin temperature becomes (the melting point of the resin+20) to (the melting point of the resin+50° C.), and the step of then molding the resultant resin composition, and, for example, in injection molding, molding may be made by injecting the resin composition into a mold from the resin discharge outlet. In this instance, the range of the mold temperature is set to be in a known temperature range, for example, preferably in the range of room temperature (23° C.) or higher, more preferably in the range of 40° C. or higher, further preferably in the range of 120° C. or higher, and preferably in the range of 300° C. or lower, more preferably in the range of 200° C. or lower, most preferably in the range of 180° C. or lower. The dwelling step in the mold requires a period of time until gate seal by solidification of the resin is completed. The dwell time varies depending on the size, shape, and the like of the molded body to be produced and cannot be generally determined, but, when the mold temperature is in the above-mentioned range, dwelling proceeds relatively quickly and the molding cycle can be shortened, and further crystallization of the resin satisfactorily proceeds, so that the resultant molded body can advantageously exhibit physical properties.

Further, in the melt-molding, for example, when melt-mixing is conducted under conditions that suppress pulverization of the glass flakes due to shearing in the resin being melted, the glass flakes in the molded body can maintain the weight average particle diameter of the glass flakes in the polyarylene sulfide resin composition.

Examples of main uses of the molded body of the invention include electric and electronic parts, such as housings for various household appliances and electronic devices, e.g., a mobile phone and a PC (Personal Computer), protecting or supporting members for box-type electric or electronic part integrated module, individual semiconductors or modules, a sensor, an LED lamp, a connector, a socket, a resistor, a relay casing, a switch, a coil bobbin, a capacitor, a variable capacitor casing, an optical pickup, an oscillator, various types of terminal blocks, a transformer, a plug, a printed substrate, a tuner, a loudspeaker, a microphone, a headset, a small-size motor, a magnetic head base, a power module, a terminal block, a semiconductor, a liquid crystal, an FDD carriage, an FDD chassis, a motor brush holder, a satellite dish, and computer-related parts; household and office appliance parts, such as VTR parts, television parts, an iron, a hair dryer, rice cooker parts, microwave oven parts, acoustic parts, sound and picture device parts, e.g., an audio and laser disc, a compact disc, a DVD disc, and a Blu-ray disc, lighting parts, refrigerator parts, air conditioner parts, typewriter parts, word processor parts, and water-related appliance parts, e.g., a water level or temperature sensor for a hot-water supply apparatus and bath; machine-related parts, such as office computer-related parts, telephone-related parts, facsimile-related parts, copying machine-related parts, cleaning jigs, motor parts, a lighter, and a typewriter; optical device- and precision machine-related parts, such as a microscope, a binocular, a camera, and a clock; and automobile- and vehicle-related parts, such as an alternator terminal, an alternator connector, a brush holder, a slip ring, an IC regulator, a potentiometer base for light diya, a relay block, an inhibitor switch, various types of valves, e.g., an exhaust gas valve, fuel-related, exhaust and intake pipes, an air intake nozzle snorkel, an intake manifold, a fuel pump, an engine cooling water joint, a carburetor main body, a carburetor spacer, an exhaust gas sensor, a cooling water sensor, an oil temperature sensor, a brake pad wear sensor, a throttle position sensor, a crank shaft position sensor, an air flow meter, a brake pad wear sensor, a thermostat base for air conditioner, a heater heated-air flow control valve, a brush holder for radiator motor, a water pump impeller, a turbine vane, wiper motor-related parts, a distributor, a starter switch, an ignition coil and a bobbin thereof, a motor insulator, a motor rotor, a motor core, a starter relay, a wire harness for transmission, a window washer nozzle, an air conditioner panel switch substrate, a coil for fuel-related solenoid valve, a connector for fuse, a horn terminal, an electrical part insulator, a stepping motor rotor, a lamp socket, a lamp reflector, a lamp housing, a brake piston, a solenoid bobbin, an engine oil filter, an ignition device casing, and casings for containing therein a power module, an invertor, a power device, an intelligent power module, an insulated gate bipolar transistor, a power control unit, a reactor, a convertor, a capacitor, an insulator, a motor terminal block, a battery, an electric compressor, a battery current sensor, a junction block, an ignition coil for DLI system, or the like, and the molded body can be applied to other uses.

EXAMPLES

Hereinbelow, the present invention will be described in more detail with reference to the following specific examples. The "part(s)" and "%" are given by mass unless otherwise specified.
(Measurement of a Melt Viscosity of the PPS Resin)
Using a Koka-type flow tester (CFT-500D, Shimadzu Corporation), the PPS resin produced in the Production Example below was maintained at 300° C., a load: $1.96 \times 10^6$ Pa, and L/D=10 (mm)/1 (mm) for 6 minutes, and then a melt viscosity was measured.
(Production Example)
Production of a PPS Resin
[Step 1]
Into a 150-litter autoclave having an agitating blade and having connected thereto a pressure gauge, a thermometer, a condenser, a decanter, and a rectifying column were charged 33.075 parts by mass (225 parts by mole) of p-dichlorobenzene (hereinafter, abbreviated to "p-DCB"), 3.420 parts by mass (34.5 parts by mole) of NMP, 27.300 parts by mass of a 47.23% by mass aqueous NaSH solution (230 parts by mole of NaSH), and 18.533 parts by mass of a 49.21% by mass aqueous NaOH solution (228 parts by mole of NaOH), and, while stirring, the temperature of the resultant mixture was increased to 173° C. over 5 hours in a nitrogen gas atmosphere so that 27.300 parts by mass of water was distilled off, and then the autoclave was closed. The p-DCB distilled due to azeotropic distillation caused during the dehydration was separated by the decanter and instantly returned to the autoclave. After completion of the dehydration, the inside of the autoclave was in a state such that an anhydrous sodium sulfide composition in the form of fine particles was dispersed in p-DCB. The fact that the NMP content of the composition was 0.079 part by mass (0.8 part by mole) showed that 98 mol % (33.7 parts by mole) of the charged NMP had been hydrolyzed to a sodium salt of a rung-opening product of NMP (4-(methylamino) butyric acid) (hereinafter, abbreviated to "SMAB"). The SMAB amount in the autoclave was 0.147 part by mole per 1 mol of the sulfur atom present in the autoclave. The theoretical dehydration amount determined on the assumption that all the charged NaSH and NaOH are changed to anhydrous Na2S is 27.921 parts by mass, and therefore this indicates that, among 0.878 part by mass (48.8 parts by mole) of the water remaining in the autoclave, 0.609 part by mass (33.8 parts by mole) of the water was consumed in the hydrolysis reaction of NMP and NaOH and was not present in the form of water in the autoclave, and 0.269 part by mass (14.9 parts by mole) of the water remained in the autoclave in the form of water, or water of crystallization. The water content in the autoclave was 0.065 mol per 1 mol of the sulfur atom present in the autoclave.

[Step 2]

After completion of the dehydration step, the temperature in the autoclave was reduced to 160° C., and 46.343 parts by mass (467.5 parts by mole) of NMP was charged and the temperature was increased to 185° C. The water content in the autoclave was 0.025 mol per 1 mol of the NMP charged in the step 2. At a point in time when the gauge pressure reached 0.00 MPa, the valve to which the rectifying column was connected was opened, and the temperature in the autoclave was increased to 200° C. over one hour. In this instance, cooling and the degree of opening of the valve were controlled so that the rectifying column outlet temperature became 110° C. or lower. The mixed vapor of distilled p-DCB and water was condensed by the condenser and separated by the decanter, and the p-DCB was returned to the autoclave. The amount of the water distilled was 0.228 part by mass (12.7 parts by mole).

[Step 3]

At the start of the step 3, the water content in the autoclave was 0.041 part by mass (2.3 parts by mole), and was 0.005 mol per 1 mol of the NMP charged in the step 2, and 0.010 mol per 1 mol of the sulfur atom present in the autoclave. Like the step 1, the SMAB amount in the autoclave was 0.147 mol per 1 mol of the sulfur atom present in the autoclave. Then, the temperature in the autoclave was increased from 200° C. to 230° C. over 3 hours, and the mixture was stirred at 230° C. for one hour, and then the temperature was increased to 250° C. and the mixture was stirred for one hour. At a point in time when the temperature in the autoclave was 200° C., the gauge pressure was 0.03 MPa, and the final gauge pressure was 0.40 MPa. Among the slurry obtained after cooling, 0.650 part by mass of the slurry was poured into 3 parts by mass (3 parts by litter) of water and the resultant mixture was stirred at 80° C. for one hour, and then subjected to filtration. The resultant cake was further washed by stirring it in 3 parts by mass (3 parts by litter) of warm water for one hour, and then subjected to filtration. This operation was repeated four times. 3 Parts by mass (3 parts by litter) of warm water and acetic acid were added to the cake to adjust the pH to 4.0, and then the cake was further washed by stirring for one hour, and then subjected to filtration. The resultant cake was further washed by stirring it in 3 parts by mass (3 parts by litter) of warm water for one hour, and then subjected to filtration. This operation was repeated twice. The resultant cake was dried using a hot-air dryer at 120° C. overnight to obtain a PPS resin (A) in the form of a white powder. The melt viscosity of the obtained polymer at 300° C. was 56 Pa·s. The non-Newtonian index was 1.07.

(Raw Materials Used)

The components of a polyarylene sulfide resin composition as raw materials are shown below.

PAS resin (A): the PPS resin produced in the above-mentioned Production Example was used.

Olefin polymer (B)

Olefin polymer (B-1) (ethylene-maleic anhydride-glycidyl methacrylate copolymer); trade name: "BONDFAST 7L", manufactured by Sumitomo Chemical Co., Ltd.

Olefin polymer (B-2) (ethylene-maleic anhydride-glycidyl methacrylate copolymer); trade name: "BONDFAST 7M", manufactured by Sumitomo Chemical Co., Ltd.

Olefin polymer (B-3) (ethylene-α-olefin polymer); trade name: "Engage 8842", manufactured by The Dow Chemical Company Silicate mineral Zeolite (C-1): trade name: "Zeolum A type A-5", manufactured by Tosoh Corp.

Talc (C-2): trade name: "HF5000PJ", manufactured by Matsumura Sangyo Co., Ltd.

Mica (C-3): trade name: "A-21S", manufactured by Yamaguchi Mica Co., Ltd.

Calcium carbonate (C-4): trade name: "Calcium Carbonate First grade", manufactured by Sankyo Seifun Co., Ltd.

Glass fibers (D1): fiber length: 3 mm; average diameter: 10 μm; trade name: "T-717H", manufactured by Nippon Electric Glass Co., Ltd.

Glass flakes (D2)

Glass flakes (D2-1): average thickness: 5 μm; weight average particle diameter: 160 μm; trade name: "REFG-301", manufactured by Nippon Sheet Glass Co., Ltd.

Glass flakes (D2-2): average thickness: 5 μm; weight average particle diameter: 160 μm; trade name: "REFG-315", manufactured by Nippon Sheet Glass Co., Ltd.

Glass flakes (D2-3): average thickness: 5 μm; weight average particle diameter: 600 μm; trade name: "REFG-112", manufactured by Nippon Sheet Glass Co., Ltd.

(Production of a Polyarylene Sulfide Resin Composition)

According to the components of the composition and the amounts (all indicated by parts by mass) shown in Tables 1 and 2, the materials were uniformly mixed by means of a tumbler. Then, glass flakes (D2) were charged, together with a PAS resin (A), an olefin polymer (B), and zeolite (C), into a vented twin-screw extruder (TEX30α, manufactured by The Japan Steel Works, Ltd.) from the top feeder inlet, and melt-kneaded using a screw of a full-flighted type at a resin component discharge rate of 30 kg/hr, at a screw revolution speed of 220 rpm, and at a resin temperature set to 320° C., obtaining pellets of the polyarylene sulfide resin compositions in Examples 1 to 9 and Comparative Examples 1 to 6.

(Method for Measuring a Weight Average Particle Diameter of Glass Flakes)

The pellets of the polyarylene sulfide resin composition were burned under conditions at 550° C. for 3 hr, and a particle size distribution of the resultant ash was measured by a sonic vibration sieving method. The apparatus used, measurement method, and measurement conditions are shown below.

Apparatus used: RPS-85 (manufactured by Seishin Enterprise Co., Ltd.)

Measurement Method:

1. A 75ϕ sieve is set in the apparatus.
2. A sample in an appropriate amount is placed in a sample cup.
3. The sieve opening of the sieve is recorded in the apparatus.
4. Sieving is performed by means of the sonic vibration sieving apparatus (metering and sieving are automatic).

Measurement Conditions:

Measuring range: 20 to 1,400 μm

Sonic wave strength: 5

Sieving time: 5 minutes

Vibration interval: One/second (Measurement of a Melt Crystallization Temperature of the Polyarylene Sulfide Resin Composition)

The polyarylene sulfide resin composition was melted at 350° C., and then quenched to prepare a non-crystalline film, and, from the prepared film, about 10 mg of the film was weighed and a melt crystallization temperature (° C.) was measured using a differential scanning calorimeter ("DSC 8500", manufactured by Perkin Elmer Co., Ltd.).

Measurement conditions were as follows. The film was melted and maintained at 350° C. for 3 minutes, and then the temperature was decreased at a rate of 20° C./minute, and an exotherm peak temperature caused due to crystallization was measured as a melt crystallization temperature.

(Method for Evaluating a Weld Strength)
(Production of a Molded Body)

Using the pellets of the polyarylene sulfide resin compositions in Examples 1 to 9 and Comparative Examples 1 to 6, the pellets were fed to an injection molding machine (SE75D-HP), manufactured by Sumitomo Heavy Industries, Ltd., having a cylinder temperature set to 310° C., and subjected to injection molding using a mold having a mold temperature controlled to 140° C., wherein the mold is for use in molding an ISO type A1 dumbbell specimen having a weld portion in the middle of the molded body, obtaining an ISO type A1 dumbbell specimen having a weld portion in the middle of the molded body.

The dwell time in the molding was determined by measuring a gate seal time required until the pressure in the mold upon dwelling became zero. In Examples 1 to 9, molding was conducted for a dwell time of 12 seconds, and, in Comparative Examples 1 to 6, molding was conducted for a dwell time of 13 seconds.

(Measurement of a Weld Strength of the Molded Body)

With respect to the obtained test specimen, a tensile strength at break was measured using a tensile tester, manufactured by Instron Corporation, at a strain rate of 5 mm/min, at a distance between the supports of 115 mm, and at 23° C.

(Method for Evaluating Flexural Toughness in the TD Direction)
(Production of a Molded Body)

Using the pellets of the polyarylene sulfide resin compositions in Examples 1 to 9 and Comparative Examples 1 to 6, the pellets were fed to an injection molding machine (SE75D-HP), manufactured by Sumitomo Heavy Industries, Ltd., having a cylinder temperature set to 310° C., and melt-mixed using a screw of a full-flighted type at a melting temperature of 310° C., and then subjected to injection molding using a mold having a mold temperature controlled to 140° C., wherein the mold is for use in molding a 60×60×2 mm flat plate, obtaining a molded body having a 60×60×2 mm flat plate shape. Then, the molded body was cut into a 25×60×2 mm shape so that the resin flow direction was the short side, and subjected to flexural test.

(Measurement of a Flexural Elongation in the TD Direction)

According to JIS-K7171, a flexural elongation (%) of the obtained test specimen in the TD direction was measured. The larger the elongation, the more excellent the flexural toughness in the TD direction.

TABLE 1

| | | Example 1 | Example 2 | Example 3 | Example 4 | Example 5 | Example 6 | Example 7 | Example 8 | Example 9 |
|---|---|---|---|---|---|---|---|---|---|---|
| PAS resin (A) | A-1 | 100 | 100 | 100 | 100 | 100 | 100 | 100 | 100 | 100 |
| Olefin polymer (B) | B-1 | 10.7 | | | 10.7 | 10.7 | 10.7 | 10.7 | 10.7 | 10.7 |
| | B-2 | | 10.7 | 7.5 | | | | | | |
| | B-3 | | | 3.2 | | | | | | |
| Mineral | C-1 | 1.1 | 1.1 | 1.1 | 1.1 | 2.1 | 6.4 | 10.7 | 1.1 | 1.1 |
| | C-2 | | | | | | | | | |
| | C-3 | | | | | | | | | |
| | C-4 | | | | | | | | | |
| Glass fibers (D1) | D1 | 64.1 | 64.1 | 64.1 | 64.1 | 64.1 | 64.1 | 64.1 | 84.8 | 54.9 |
| Glass flakes (D2) | D2-1 | 37.8 | 37.8 | 37.8 | | 36.8 | 32.5 | 28.2 | 17.1 | 47.0 |
| | D2-2 | | | | 37.8 | | | | | |
| | D2-3 | | | | | | | | | |
| total | | 213.7 | 213.7 | 213.7 | 213.7 | 213.7 | 213.7 | 213.7 | 213.7 | 213.7 |
| Weight average particle diameter (μm) of glass flakes in pellets after compounding | | 66 | 64 | 70 | 69 | 65 | 63 | 62 | 64 | 66 |
| Melt crystallization temperature (° C.) of resin composition | | 233 | 234 | 234 | 231 | 236 | 239 | 243 | 235 | 233 |
| TD flexural elongation (%) | | 1.6 | 1.6 | 1.7 | 1.6 | 1.6 | 1.5 | 1.5 | 1.5 | 1.6 |
| weld strength (MPa) | | 46 | 49 | 48 | 45 | 47 | 47 | 44 | 49 | 46 |

TABLE 2

| | | Comparative Example 1 | Comparative Example 2 | Comparative Example 3 | Comparative Example 4 | Comparative Example 5 | Comparative Example 6 |
|---|---|---|---|---|---|---|---|
| PAS resin (A) | A-1 | 100 | 100 | 100 | 100 | 100 | 100 |
| Olefin polymer (B) | B-1 | 10.7 | 10.7 | 10.7 | 10.7 | 14 | 10.7 |
| | B-2 | | | | | | |
| | B-3 | | | | | | |
| Mineral | C-1 | | | | | | 1.1 |
| | C-2 | | 1.1 | | | | |
| | C-3 | | | 1.1 | | | |
| | C-4 | | | | 10.7 | 24.4 | |

TABLE 2-continued

|  |  | Comparative Example 1 | Comparative Example 2 | Comparative Example 3 | Comparative Example 4 | Comparative Example 5 | Comparative Example 6 |
|---|---|---|---|---|---|---|---|
| Glass fibers (D1) | D1 | 64.1 | 64.1 | 64.1 | 64.1 | 59.3 | 64.1 |
| Glass flakes (D2) | D2-1 | 38.9 | 37.8 | 37.8 | 28.2 | 34.9 |  |
|  | D2-2 |  |  |  |  |  |  |
|  | D2-3 |  |  |  |  |  | 37.8 |
| total |  | 213.7 | 213.7 | 213.7 | 213.7 | 232.6 | 213.7 |
| Weight average particle diameter (μm) of glass flakes in pellets after compounding |  | 68 | 66 | 67 | 63 | 63 | 132 |
| Melt crystallization temperature (° C.) of resin composition |  | 225 | 226 | 225 | 225 | 227 | 228 |
| TD flexural elongation (%) |  | 1.6 | 1.4 | 1.4 | 1.4 | 1.4 | 1.2 |
| weld strength (MPa) |  | 38 | 37 | 35 | 39 | 38 | 36 |

From the results shown in Tables 1 and 2, it is apparent that the molded bodies of the polyarylene sulfide resin compositions in Examples 1 to 9 are remarkably improved in the mechanical strength at a weld portion, as compared to the molded body in Comparative Example 1. In contrast, with respect to the molded bodies of the polyarylene sulfide resin compositions in Comparative Examples 2 to 5, in which talc, mica, or calcium carbonate, which is a silicate mineral similar to the zeolite (C), was incorporated into the resin composition, it is found that, unlike the zeolite (C), the incorporated talc, mica, or calcium carbonate cannot optimize the crystallization rate of the PPS resin and therefore, particularly the weld strength of the molded body becomes poor.

Further, with respect to the molded bodies of the polyarylene sulfide resin compositions in Examples 1 to 9, it is found that the weld strength of the molded body is improved, and further the flexural toughness in the TD direction is improved, as compared to those of the molded body in Comparative Example 6 using the glass flakes (D2) having a larger weight average particle diameter.

(Method for Evaluating Thermal Shock Properties)
(Production of a Molded Body)

The SUS steel material having a rectangular parallelepiped shape (hereinafter, referred to as "parallelepiped steel") shown in FIG. 1 was placed in a mold cavity which had been produced so that the resultant resin having a thickness of 1 mm covers the entire surface of the parallelepiped steel, and then, using the pellets of the polyarylene sulfide resin compositions in Examples 1 to 9 and Comparative Examples 1 to 6, the pellets were fed to an injection molding machine (SE75D-HP), manufactured by Sumitomo Heavy Industries, Ltd., having a cylinder temperature set to 310° C., and subjected to injection molding using the mold having a mold temperature controlled to 140° C., producing a molded body which is a composite of the parallelepiped steel and a resin for evaluating the thermal shock properties. In this instance, with respect to two through-holes (2) in the parallelepiped steel (L: 25 mm; W: 40 mm; H: 10 mm) of FIG. 1, the pins set in the mold, each having the same diameter as the through-hole, were inserted into the through-holes from the upper surface so as to fix the parallelepiped steel and prevent the resin from flowing into the holes, and injection molding was made from two positions (3) of the side of the parallelepiped steel using pin gates, and the molded body to be evaluated had a plurality of weld portions.

(Measurement of Thermal Shock Properties of the Molded Body)

The obtained test specimen was introduced into a thermal shock test apparatus ("TSA-103EL", manufactured by ESPEC Corp.), and subjected to thermal cycle of −40° C./30 minutes→150° C./30 minutes (1 cycle: 1 hour). After each thermal cycle, the appearance of the molded body was observed, and the number of thermal cycles before a crack was formed was measured, and an average of 5 measurements was determined.

TABLE 3

|  |  | Example 1 | Example 2 | Example 3 | Example 4 | Example 5 |
|---|---|---|---|---|---|---|
| PAS resin (A) | A-1 | 100 | 100 | 100 | 100 | 100 |
| Olefin polymer (B) | B-1 | 10.7 |  |  | 10.7 | 10.7 |
|  | B-2 |  | 10.7 | 7.5 |  |  |
|  | B-3 |  |  | 3.2 |  |  |
| Mineral | C-1 | 1.1 | 1.1 | 1.1 | 1.1 | 2.1 |
|  | C-2 |  |  |  |  |  |
|  | C-3 |  |  |  |  |  |
|  | C-4 |  |  |  |  |  |
| Glass fibers (D1) | D1 | 64.1 | 64.1 | 64.1 | 64.1 | 64.1 |
| Glass flakes (D2) | D2-1 | 37.8 | 37.8 | 37.8 |  | 36.8 |
|  | D2-2 |  |  |  | 37.8 |  |
|  | D2-3 |  |  |  |  |  |
| total |  | 213.7 | 213.7 | 213.7 | 213.7 | 213.7 |
| Weight average particle diameter (μm) of glass flakes in pellets after compounding |  | 66 | 64 | 70 | 69 | 65 |

TABLE 3-continued

|  | Example 1 | Example 2 | Example 3 | Example 4 | Example 5 |
|---|---|---|---|---|---|
| Melt crystallization temperature (° C.) of resin composition | 233 | 234 | 234 | 231 | 236 |
| TD flexural elongation (%) | 1.6 | 1.6 | 1.7 | 1.6 | 1.6 |
| weld strength (MPa) | 46 | 49 | 48 | 45 | 47 |
| Thermal shock properties (Number of cycles) | 60 | 70 | 75 | 50 | 60 |

TABLE 4

|  |  | Example 6 | Example 7 | Example 8 | Example 9 |
|---|---|---|---|---|---|
| PAS resin (A) | A-1 | 100 | 100 | 100 | 100 |
| Olefin polymer (B) | B-1 | 10.7 | 10.7 | 10.7 | 10.7 |
|  | B-2 |  |  |  |  |
|  | B-3 |  |  |  |  |
| Mineral | C-1 | 6.4 | 10.7 | 1.1 | 1.1 |
|  | C-2 |  |  |  |  |
|  | C-3 |  |  |  |  |
|  | C-4 |  |  |  |  |
| Glass fibers (D1) | D1 | 64.1 | 64.1 | 84.8 | 54.9 |
| Glass flakes (D2) | D2-1 | 32.5 | 28.2 | 17.1 | 47.0 |
|  | D2-2 |  |  |  |  |
|  | D2-3 |  |  |  |  |
| total |  | 213.7 | 213.7 | 213.7 | 213.7 |
| Weight average particle diameter (μm) of glass flakes in pellets after compounding |  | 63 | 62 | 64 | 66 |
| Melt crystallization temperature (° C.) of resin composition |  | 239 | 243 | 235 | 233 |
| TD flexural elongation (%) |  | 1.5 | 1.5 | 1.5 | 1.6 |
| weld strength (MPa) |  | 47 | 44 | 49 | 46 |
| Thermal shock properties (Number of cycles) |  | 50 | 45 | 50 | 60 |

TABLE 5

|  |  | Comparative Example 1 | Comparative Example 2 | Comparative Example 3 | Comparative Example 4 | Comparative Example 5 | Comparative Example 6 |
|---|---|---|---|---|---|---|---|
| PAS resin (A) | A-1 | 100 | 100 | 100 | 100 | 100 | 100 |
| Olefin polymer (B) | B-1 | 10.7 | 10.7 | 10.7 | 10.7 | 14 | 10.7 |
|  | B-2 |  |  |  |  |  |  |
|  | B-3 |  |  |  |  |  |  |
| Mineral | C-1 |  |  |  |  |  | 1.1 |
|  | C-2 |  | 1.1 |  |  |  |  |
|  | C-3 |  |  | 1.1 |  |  |  |
|  | C-4 |  |  |  | 10.7 | 24.4 |  |
| Glass fibers (D1) | D1 | 64.1 | 64.1 | 64.1 | 64.1 | 59.3 | 64.1 |
| Glass flakes (D2) | D2-1 | 38.9 | 37.8 | 37.8 | 28.2 | 34.9 |  |
|  | D2-2 |  |  |  |  |  |  |
|  | D2-3 |  |  |  |  |  | 37.8 |
| Total |  | 213.7 | 213.7 | 213.7 | 213.7 | 232.6 | 213.7 |
| Weight average particle diameter (μm) of glass flakes in pellets after compounding |  | 68 | 66 | 67 | 63 | 63 | 132 |
| Melt crystallization temperature (° C.) of resin composition |  | 225 | 226 | 225 | 225 | 227 | 228 |
| TD flexural elongation (%) |  | 1.6 | 1.4 | 1.4 | 1.4 | 1.4 | 1.2 |
| weld strength (MPa) |  | 38 | 37 | 35 | 39 | 38 | 36 |
| Thermal shock properties (Number of cycles) |  | 40 | 30 | 30 | 35 | 35 | 30 |

From the results shown in Tables 3 to 5, it is apparent that the molded bodies using the polyarylene sulfide resin compositions in Examples 1 to 9 were improved in the thermal shock properties, as compared to the molded bodies in Comparative Examples 1 to 6. The reason for this is considered that the glass flakes dispersed in the polyarylene sulfide resin composition were pulverized so as to have a particle diameter in the specific range, and further the olefin copolymer and zeolite present in the resin composition were able to efficiently disperse the stress caused when exposed to a thermal shock environment, so that the thermal shock properties were improved.

REFERENCE SIGNS LIST

L: Length of the parallelepiped steel
W: Width of the parallelepiped steel
H: Height of the parallelepiped steel
1: Parallelepiped steel
2: Through-hole
3: Side of the parallelepiped steel (Resin flow direction from two pin gates)

The invention claimed is:

1. A polyarylene sulfide resin composition containing a polyarylene sulfide resin (A), an olefin polymer (B), zeolite (C), glass fibers (D1), and glass flakes (D2),
wherein the glass flakes (D2) have a weight average particle diameter in the range of 100 μm or less and is present in the range of 4-70 parts by weight, relative to 100 parts by mass of the polyarylene sulfide resin (A),
wherein the glass fibers (D1) are present in the range of 32-120 parts by weight, relative to 100 parts by mass of the polyarylene sulfide resin (A), and treated with a coupling agent,
wherein the amount of the zeolite (C) contained is in the range of 1-10 parts by mass, relative to 100 parts by mass of the polyarylene sulfide resin (A), and is selected from the group consisting of analcite, wairakite, natrolite, mesolite, thomsonite, gonnardite, scolecite, edingtonite, gismondine, A-type synthetic zeolite, laumontite, mordenite, yugawaralite, erionite, ashcroftine, heulandite, clinoptilolite, stilbite, epistilbite, d'achiardite, phillipsite, harmotome, gmelinite, chabazite, and faujasite, and
wherein the olefin polymer (B) comprises a copolymer of an alkene, an alkyl acrylate, and glycidyl acrylate and is present in the range of 5-15 parts by mass, relative to 100 parts by mass of the polyarylene sulfide resin (A).

2. The polyarylene sulfide resin composition according to claim 1, which is a melt-kneaded mixture.

3. The polyarylene sulfide resin composition according to claim 1, which is in a pellet form.

4. A molded body which is obtained by molding the polyarylene sulfide resin composition according to claim 1.

5. A method for producing a polyarylene sulfide resin composition, having the step of melt-kneading a polyarylene sulfide resin (A), an olefin polymer (B), zeolite (C), glass fibers (D1), and glass flakes (D2) at the melting point of the polyarylene sulfide resin (A) or higher,
wherein the glass flakes (D2) have a weight average particle diameter in the range of 100 μm or less and is present in the range of 4-70 parts by weight, relative to 100 parts by mass of the polyarylene sulfide resin (A),
wherein the glass fibers (D1) are present in the range of 32-120 parts by weight, relative to 100 parts by mass of the polyarylene sulfide resin (A), and treated with a coupling agent,
wherein the amount of the zeolite (C) contained is in the range of 1 to 10 parts by mass, relative to 100 parts by mass of the polyarylene sulfide resin (A), and is selected from the group consisting of analcite, wairakite, natrolite, mesolite, thomsonite, gonnardite, scolecite, edingtonite, gismondine, A-type synthetic zeolite, laumontite, mordenite, yugawaralite, erionite, ashcroftine, heulandite, clinoptilolite, stilbite, epistilbite, d'achiardite, phillipsite, harmotome, gmelinite, chabazite, and faujasite, and
wherein the olefin polymer (B) comprises a copolymer of an alkene, an alkyl acrylate, and glycidyl acrylate and is present in the range of 5-15 parts by mass, relative to 100 parts by mass of the polyarylene sulfide resin (A).

6. A method for producing a molded body, having the step of producing a polyarylene sulfide resin composition by the method according to claim 5, and the step of melt-molding the obtained polyarylene sulfide resin composition.

7. The polyarylene sulfide resin composition according to claim 2, which is in a pellet form.

8. A molded body which is obtained by molding the polyarylene sulfide resin composition according to claim 2.

9. A molded body which is obtained by molding the polyarylene sulfide resin composition according to claim 3.

* * * * *